United States Patent [19]

Selva

[11] 4,095,586

[45] Jun. 20, 1978

[54] BREAD OVEN

[75] Inventor: Guy Selva, Lyon, France

[73] Assignee: F.M.I.B. —Selva Papin et Eugene Selva Reunis, Lyon, France

[21] Appl. No.: 719,528

[22] Filed: Sep. 1, 1976

[30] Foreign Application Priority Data

Nov. 21, 1975 France .................................. 75 36414

[51] Int. Cl.$^2$ ............................................. F21B 1/02
[52] U.S. Cl. ..................................... 126/273 R; 126/8
[58] Field of Search .................... 126/273 R, 273 S, 8, 126/19 R, 2, 1 R, 1 AA, 55, 12, 13, 245, 9 R; 99/467, 482

[56] References Cited

U.S. PATENT DOCUMENTS

| 103,715 | 5/1870 | Buys | 126/2 |
|---|---|---|---|
| 275,784 | 4/1883 | McDowell | 126/19 |
| 582,330 | 5/1897 | Williams | 126/273 R |
| 911,799 | 2/1909 | Ahlheim | 126/273 R |
| 1,425,709 | 8/1922 | Summer | 126/19 R |
| 3,477,360 | 11/1969 | Raney | 126/19 R X |

FOREIGN PATENT DOCUMENTS

| 64,045 | 3/1914 | Austria | 126/9 R |
|---|---|---|---|
| 397,726 | 5/1909 | France | 126/273 R |
| 450,215 | 7/1936 | United Kingdom | 126/273 |
| 15,441 | 6/1903 | United Kingdom | 126/9 R |

Primary Examiner—William F. O'Dea
Assistant Examiner—Harold Joyce
Attorney, Agent, or Firm—Fleit & Jacobson

[57] ABSTRACT

Bread oven for individual or home use. A fume vent is arranged in the roof of the oven at the opposite end from the source of heat so that the hot gases contact the roof to heat it. A by-pass passage is provided, which can be unblocked by one position of the ash pan to produce a counter-draft and thus slow down the rate of heat production. The ash pan can also be positioned so that the by-pass passage vents fumes from cinders or embers in it.

4 Claims, 4 Drawing Figures

BREAD OVEN

BACKGROUND OF THE INVENTION

The present invention relates to improvements in bread ovens and in particular to ovens of a relatively small size for individual or home use for satisfactory baking of bread for pizzas and related products.

SUMMARY OF THE INVENTION

The oven, according to the invention, is characterized by having a fume vent at one end of the roof, preferably adjacent the oven opening, so that hot gases emitted by a wood fire at the opposie end contact the roof to maintain it at an elevated temperature.

A further characteristic of the invention resides in the provision of a by-pass passage leading from outside the oven to a fume collection area and having related closing means so as to permit the control of a counter-draft in suitable amount to slow down the rate of combustion and thus the heating effect. In a preferred embodiment the by-pass passage leads to the interior of an ash pan positioned immediatey below the base of the oven so that displacement of the ash pan controls the opening and closing of the by-pass passage and further permits ventilation of the fumes from the embers and cinders transferred to the ash pan after the initial heating step.

BRIEF DESCRIPTION OF THE DRAWINGS

Two embodiments of the invention will now be described, by way of example only, with reference to the accompanying drawings in which.

DESCRIPTION OF THE PREFERRED EMBODIMENTS

Figure 2:
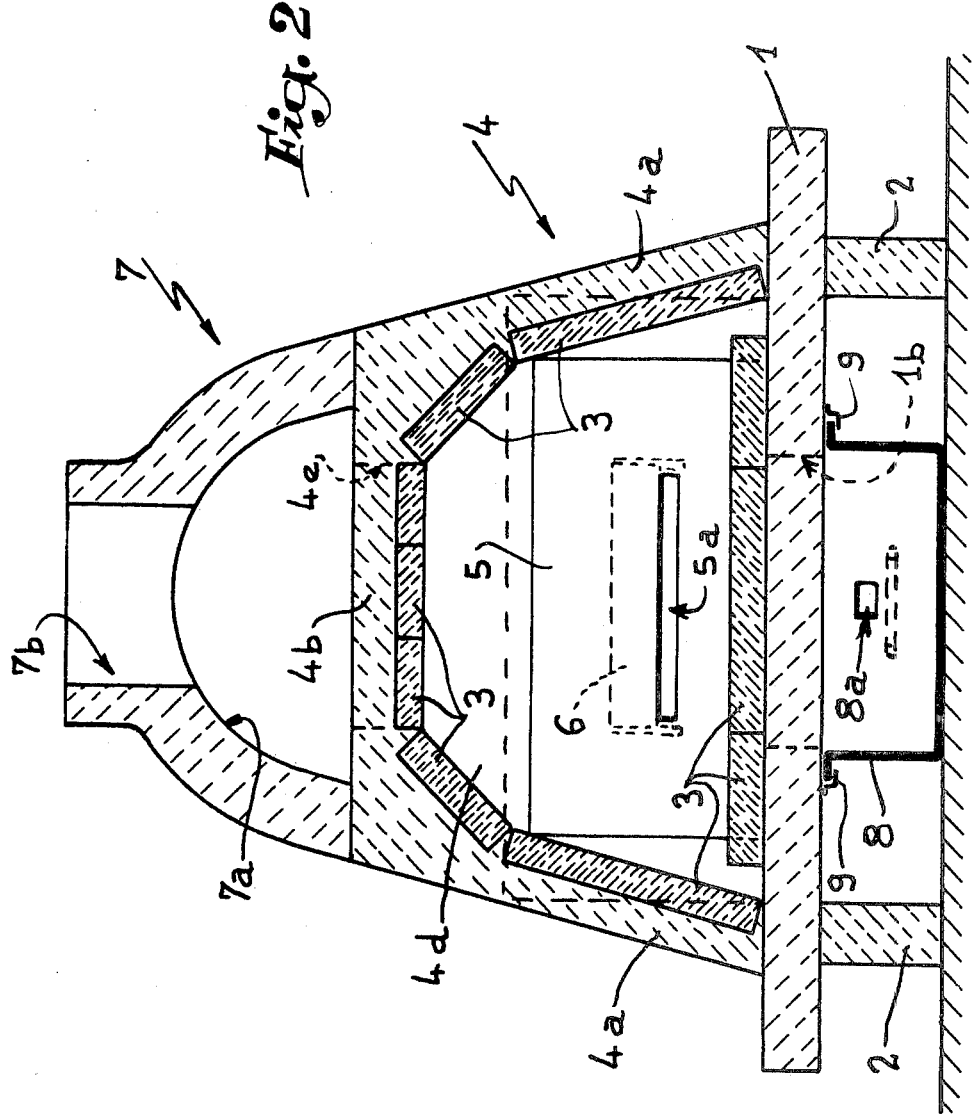
FIG. 2 is a section along the line II—II of FIG. 1.

The oven has a horizontal support 1 positioned above the ground by two longitudinally extending feet 2. The upper surface of support 1 is covered by refractory bricks 3 forming the base of the oven. Positioned on support 1 is a trapezoidally shaped member 4 (FIG. 2) having an inverted V or U-shaped section open at the foot. Member 4 thus defines lateral walls 4a, a roof 4b, a transverse wall 4c closing one end of the oven and an opposed wall 4d having an access opening containing a door 5. The door contains an inlet air aperture 5a controlled by a register 6. The inside surfaces of member 4 are covered by refractory bricks in a similar fashion to the base.

Member 4, in turn, supports a hollow arched member 7 defining a downwardly opening cavity 7a. An aperture 7b is provided at the end of member 7 opposite to door 5, which can communicate with the normal type of chimney (not shown). An opening, or fume vent 4e is provided in the roof just to the right of transverse wall 4d communicating the interior of the oven to the cavity 7a.

The transverse wall 4c at the far end of the oven is relatively thick and contains a vertical passage 4f communicating cavity 7a with a hole 1a opening through support 1. Below support 1 there is provided an ash pan 8 movable on longitudinal guides 9 mounted on the lower surface of the support. The front wall of ash pan 8 is formed with an air inlet 8a. One of the bricks on the base of the oven, designated 3', is removable so as to uncover an opening or trap 1b immediately in front of door 5.

Figure 1:
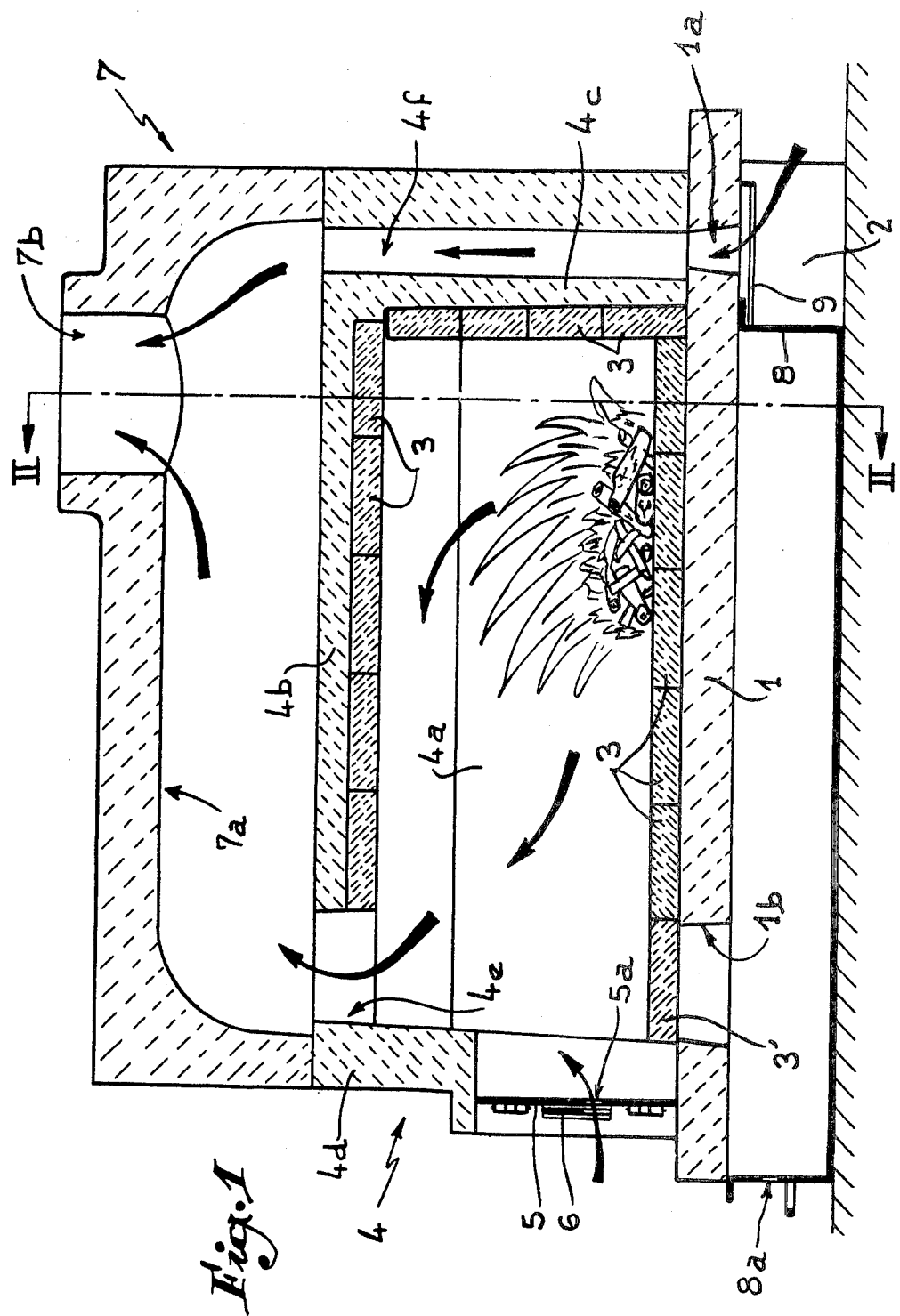
FIG. 1 is a vertical section of a bread oven, according to the invention, as it is during initial heating.

The operation of the oven will be readily understood. Referring first to FIG. 1, the oven is shown at the time of heating. Register 6 is opened and a wood fire is lit at the other end of wall 4c. The flames and hot gases contact the roof 4b, thus heating it, and are conducted out through opening 4e into cavity 7a and then leave the oven through aperture 7b. Thus, rapid heating is obtained in the interior of the oven. In order to limit the heating and control or slow-down the rate of combustion of the fire, ash pan 8 is positioned to uncover hole 1a provided in registration with vertical passage 4f thus roviding a counter-draft.

Figure 3:
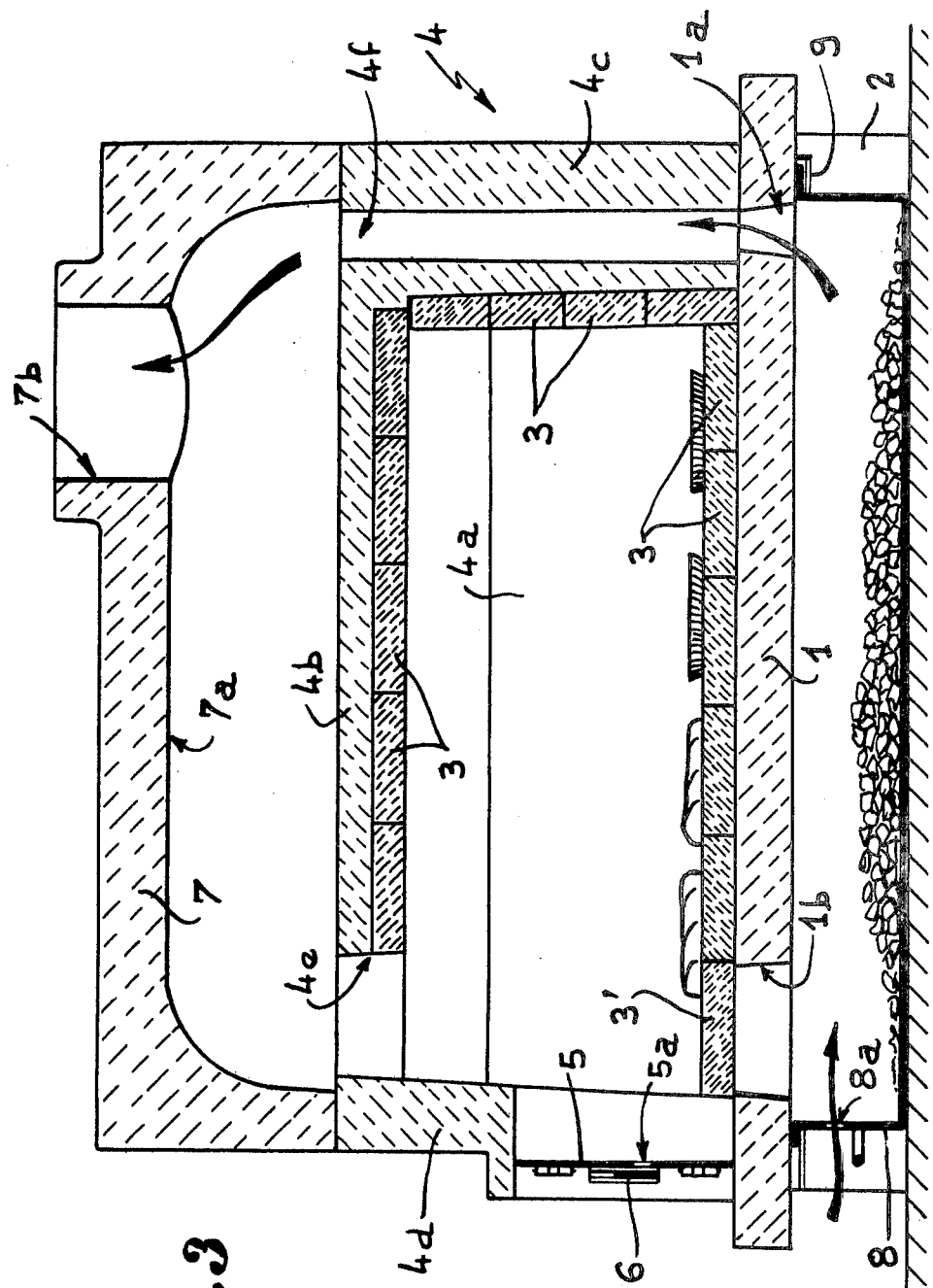
FIG. 3 is similar to FIG. 1 but showing the operation of the oven while cooking.

Once the oven is warm, brick 3' is temporarily removed in order to sweep the cinders and embers into ash pan 8 through trap 1b. Ash pan 8 is then pushed to the position shown in FIG. 3 so that the fumes and gases coming off the embers are led away through passage 4f and opening 7b. During this time the embers and hot gases maintain the temperature of the base of the oven. Register 6 in door 5 is closed so that the interior of the oven is undisturbed, producing the best conditions for the baking of bread or similar products.

It will be understood that the upper member 7 could be omitted and the fumes and gases emitted directly through fume vent 4e. It will also be realized that the exterior walls of the oven can be insulated or covered to permit use out-of-doors.

Figure 4:
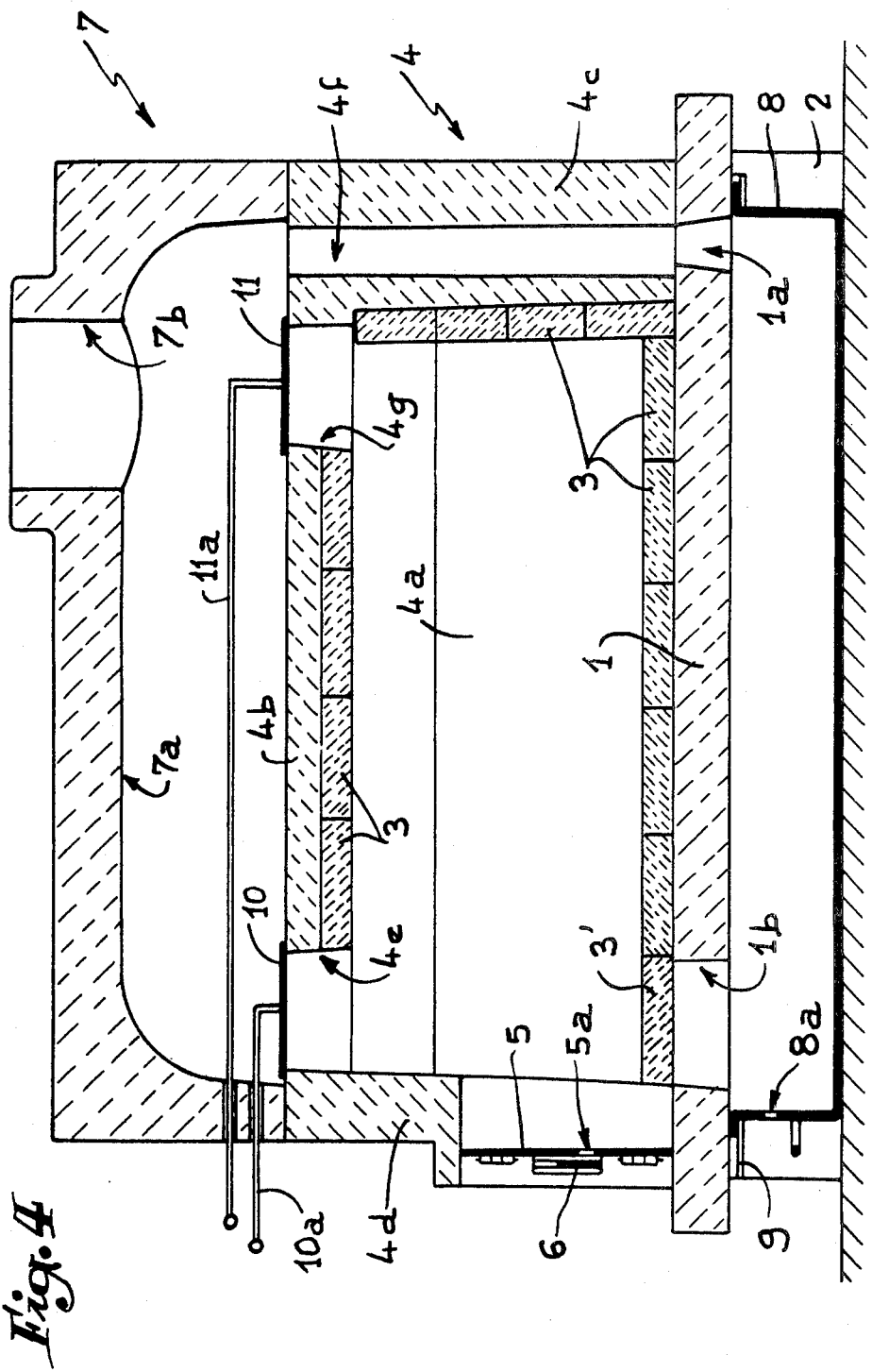
FIG. 4 is a vertical section of another embodiment of the oven according to the invention.

FIG. 4 illustrates a further embodiment in which two sliding plates 10 and 11 are connected to control rods 10a and 11a. Plate 10 controls fume vent 4e while plate 11 controls another fume vent 4g positioned in the oven roof immediately ahead of wall 4c.

To light the fire, the wood is placed at the front of the oven just in front of door 5. The two plates 10 and 11 are moved to uncover the corresponding fume vents so that combustion is easily achieved. When the fire has taken, plate 11 is moved to close the fume vent and the oven heats up in the same manner as already described with reference to the embodiment of FIGS. 1–3. It will be noted that the embers are preferaby repositioned on the base adjacent rear wall 4c. For the cooking operation, plates 10 and 11 are positioned to cover the corresponding fume vents, maintaining undisturbed conditions in the oven and a substantially constant temperature.

The invention is not limited solely to the preceding description which is given by way of example, but includes all variations within the scope of the following claims.

I claim:

1. In an oven comprising a horizontally elongated hollow refractory lined body including a base, a roof, a first end and a second end, with said first end having an air inlet aperture and with said roof being formed with a fume vent, wherein said fume vent is disposed adjacent said first end of said body in such manner that when a solid fuel is disposed on the base of said body adjacent the second end thereof, the inlet air flows along the base of said body while the flames and hot gases flow along the roof to uniformly heat same, wherein a portion of the base is selectively removable to define a first aperture in the base, and wherein the oven further comprises support means for supporting the refractory lined body, an ash pan disposed under a portion of said support means, a second aperture defined in said portion of the support means in alignment with said first aperture to allow cinders and embers from said fuel to be transferred from said body into said ash pan, a counter-draft passage formed in said second end of said body, an inlet opening defined in said support means adjacent said second end of said body in alignment with said counter-draft passage, said ash pan having first and second substantially vertical end walls with said second end wall being situated in the vicinity of said second end of said body and with said first end wall being formed with an air inlet aperture, and said ash pan being slidable longitudinally of said body between a first position in which said inlet opening of said counter-draft passage is free of said ash pan and said counter-draft passage communicates with the outer atmosphere and a second position in which said ash pan is located below said inlet opening and said counter-draft passage communicates with the inside of said ash pan to promote combustion of the embers therewithin.

2. In an oven as claimed in claim 1, the improvement further comprising means on said roof of said body for defining a cavity having a first and a second longitudinal end, with said fume vent opening adjacent said first longitudinal end of said cavity and with said second longitudinal end of said cavity being formed with an aperture for the outlet of combustion gases.

3. In an oven as claimed in claim 2, the improvement further comprising a controlled counter-draft passage formed in said second end of said body and opening into the second end of said cavity.

4. In an oven as claimed in claim 2, the improvement further comprising an additional opening being provided in the roof of said body adjacent said second end of said body for connecting said body with said cavity, and sliding plate means for controlling the size of said fume vent and said additional opening.

* * * * *